US007147691B2

(12) United States Patent
Palmer

(10) Patent No.: US 7,147,691 B2
(45) Date of Patent: Dec. 12, 2006

(54) ACID GAS ENRICHMENT PROCESS

(75) Inventor: Gary Palmer, Calgary (CA)

(73) Assignee: 1058238 Alberta Ltd., Calgary (CA)

( * ) Notice: Subject to any disclaimer, the term of this patent is extended or adjusted under 35 U.S.C. 154(b) by 0 days.

(21) Appl. No.: 10/809,822

(22) Filed: Mar. 26, 2004

(65) Prior Publication Data
US 2004/0226441 A1 Nov. 18, 2004

Related U.S. Application Data

(63) Continuation-in-part of application No. 10/671,664, filed on Sep. 29, 2003.

(30) Foreign Application Priority Data
Sep. 27, 2002 (CA) ................... 2405719

(51) Int. Cl.
B01D 53/14 (2006.01)

(52) U.S. Cl. .................. 95/186; 95/204; 95/235; 95/236; 423/220

(58) Field of Classification Search ................ 95/162, 95/168, 264, 186, 199, 204, 223, 235, 236; 423/220, 228
See application file for complete search history.

(56) References Cited

U.S. PATENT DOCUMENTS 3,435,590 A * 4/1969 Smith ..................... 95/174
3,851,041 A * 11/1974 Eickmeyer ............... 423/223
4,241,032 A * 12/1980 Werner et al. ............ 423/226
4,406,868 A * 9/1983 Carter et al. .............. 423/228
4,483,834 A * 11/1984 Wood ....................... 423/228
4,557,911 A * 12/1985 Goddin et al. ............. 423/228
4,568,364 A * 2/1986 Galstaun et al. ............ 96/176
4,591,370 A * 5/1986 Gazzi et al. ................ 62/635
4,773,921 A * 9/1988 Elgue et al. ............... 95/180
4,976,935 A * 12/1990 Lynn ........................ 423/222
5,556,606 A 9/1996 Khanmamedov

FOREIGN PATENT DOCUMENTS

GB 1551692 * 8/1979

* cited by examiner

Primary Examiner—Frank M. Lawrence
(74) Attorney, Agent, or Firm—Adrian D. Battison; Michael R. Williams; Ryan W. Dupuis

(57) ABSTRACT

The arrangements described herein are based upon a theory of selective absorption of hydrogen sulphide over carbon dioxide from gas based on countercurrent contact between gas and tertiary or other amines which exhibit preferential affinity for $H_2S$ over $CO_2$ primarily because of differential rates of absorption of the two gases. The process of enhanced selective absorption is accomplished by performing the absorption in two steps. The first operation is to contact lean amine with sour gas which contains both $H_2S$ and $CO_2$. The object of the first operation is to produce an overhead gas that meets an arbitrary standard for content of $H_2S$ and $CO_2$. The second operation is to enhance the selectivity for $H_2S$ by contacting the rich amine leaving the first operation with a second gas which is a highly concentrated acid gas having a higher $H_2S/CO_2$ ratio than the first acid gas.

14 Claims, 7 Drawing Sheets

FIGURE 1

$$CO_2 + AMINE \rightarrow [AMINE]^- + [AMINE - \overset{\overset{\displaystyle H}{\overset{\displaystyle O}{|}}}{C} - O]$$

$$CO_2 + H_2O \rightarrow H_2CO_3$$

$$H_2CO_3 \rightarrow H^- + HCO_3^-$$

$$HCO_3 \rightarrow H^+ + CO_3^-$$

$$H^+ + AMINE \rightarrow [AMINE - H]^-$$

FIGURE 2

ACID GAS ENRICHMENT PROCESS

This application is a continuation-in-part application from application Ser. No. 10/671,664 filed Sep. 29, 2003.

FIELD OF THE INVENTION

The present invention relates to treatment of natural gas generally, and in particular relates to processes for enriching acid gases for sulphur plant feeds.

BACKGROUND OF THE INVENTION a) Industry Background

Petroleum reservoirs, whether primarily oil reservoirs or gas reservoirs, often contain significant quantities of hydrogen sulphide ($H_2S$) and carbon dioxide ($CO_2$) in addition to hydrocarbons. These contaminants must be removed or at least reduced to meet commercial specifications for purity before the natural gas can be marketed to consumers. The hydrogen sulphide and carbon dioxide, usually referred to as "acid gases", have commercial value as by-products in and of themselves if, for example, the hydrogen sulphide is converted to sulphur and the $CO_2$ is used for miscible flooding of oil reservoirs. Otherwise, the acid gases are considered to have no marketable value, and are disposed of either by pumping down a disposal well or by flaring.

Commercial specifications for natural gas require that essentially all of the hydrogen sulphide be removed from the gas, typically to a final concentration of 4 PPM (parts per million) by volume or less. Carbon dioxide must likewise be reduced, but being non-toxic, the tolerance for $CO_2$ is much higher (typically 2% by volume for commercial pipeline quality gas).

The extremely stringent specification for $H_2S$ content in natural gas has dictated the type of process that must be used, and virtually all natural gas being "sweetened" today is treated by one of the various alkanolamines that are available for this purpose. More than half a century ago, the Girbitol process was introduced in which the primary amine, monoethanol amine (popularly known as "MEA"), was used as the absorbent. Since then, other amines have become popular, namely diethanoamine (DEA), and a current favourite, methyldiethanol amine (MDEA), which is popular because of its preferential affinity for hydrogen sulphide over carbon dioxide. In most cases, generic amine in an aqueous solution is used, although various processes are available in which chemical additives are used in the amine solution to enhance certain characteristics of the absorbent. Amine has gained widespread acceptance and popularity because it can produce a natural gas product that reliably meets the strict requirements for gas purity, especially the requirements for hydrogen sulphide, and can do it relatively inexpensively.

Alternative processes for acid gas removal, such as physical absorption in a solvent or distillation for removal of acid gases, have not been used extensively, except possibly for bulk removal followed by cleanup with amine or as a scavenger for small volumes. Amine is able to remove acid gas components by reacting with them, which in an equilibrium situation can potentially totally remove the acidic components from the gas. Acid gases can be removed by other processes based on chemical reaction, such as the hot carbonate process and various forms of the iron oxide process, which can meet the specifications for gas purity. However, for many practical reasons these processes have never gained widespread popularity.

Historically, the primary concern of the gas processing industry has been to produce natural gas that will meet the stringent requirements for gas purity imposed by pipeline and distribution companies who establish the specifications for natural gas. There has been much less attention directed toward the by-product of the amine process; the acid gas mixture of $H_2S$ and $CO_2$ that is co-absorbed in the process. Typically, these two gases are not subjected to any separation process to recover them as two separate entities, but are sent directly as feed to a sulphur plant. Most sulphur plants utilize some version of the Claus process in which one third of the $H_2S$ is oxidized by combustion to $SO_2$, which then subsequently reacts with the remaining two thirds of the $H_2S$ to produce elemental sulphur and water. The second acid gas component, carbon dioxide, is an inert gas and a noneparticipant in the chemical reaction, but because of the thermodynamics of the Claus process, carbon dioxide will detrimentally affect the reaction to produce sulphur. The presence of carbon dioxide dilutes the reactants—hydrogen sulphide, oxygen, and sulphur dioxide, retarding the reaction and reducing the percentage conversion to sulphur. The dilution effect directly influences the chemical equilibrium of the Claus process, fundamentally reducing the attainment of high rates of sulphur conversion. In cases where the acid gas feed to the sulphur plant is rich in $H_2S$, the effect of dilution by $CO_2$ may not be too serious, but in those cases where the quantity of $CO_2$ exceeds the quantity of $H_2S$ by a factor of five or more, the effect on thermodynamic equilibrium conversion to sulphur is very significant.

A secondary effect of dilution of $H_2S$ by excessive quantities of $CO_2$ is flame stability in the reaction furnace where $H_2S$ is oxidized to $SO_2$. Carbon dioxide is an effective fire extinguishing chemical, and when present in excessive amounts in the reaction furnace it can inhibit combustion, and in some cases completely quench the flame. The dilution effect of $CO_2$ in the firebox of the furnace will also reduce furnace temperature to the extent that complete combustion does not occur. This necessitates the addition of natural gas to the acid gas entering the sulphur plant in order to improve combustion and maintain flame temperature in the reaction furnace. Natural gas in the reaction furnace causes a further complication by increasing the undesirable reaction by-products, carbonyl sulphide and carbon disulphide. These are the products of reaction between methane and other hydrocarbons, $CO_2$, $H_2S$ and oxygen, and although they may be present in the furnace effluent in concentrations of less than 1%, they effectively bind up a portion of the sulphur which does not completely hydrolyze back to $H_2S$ in the catalyst beds of the sulphur plant, thus reducing the overall conversion of $H_2S$ to sulphur.

It is apparent that there is a clear need for a process that will increase the concentration of $H_2S$ in the feed gas entering a sulphur plant. Preferably the process should improve the conversion of $H_2S$ to sulphur, and should also solve many of the operational problems associated with feed gases that are too lean in $H_2S$.

b) Relevant Technology

Advances toward improvement of $H_2S/CO_2$ ratios in sulphur plant feed have generally been based on the selectivity of methyldiethanol amine (MDEA) for $H_2S$ over $CO_2$ when in contact with sour gas. Tertiary amines such as MDEA and also di-isopropyl amine (DIPA) exhibit this preferential affinity for $H_2S$. Other amines such as MEA and DEA tend not to exhibit significant preferential affinity, and will therefore strongly absorb both $H_2S$ and $CO_2$.

In studying the relative affinities between tertiary amines and the acid gases hydrogen sulphide and carbon dioxide, two characteristics must be considered. One is reaction equilibrium, which is defined as the final concentrations of reactants and reaction products after sufficient time has elapsed to attain steady levels. Equilibrium in thermodynamic terms occurs when the total free energy of the mixture reaches a minimum. The second characteristic to consider is reaction kinetics, which refers to the rate at which a reaction occurs. While consideration of reaction equilibrium is important, in the practical application of industrial chemistry, consideration of reaction kinetics is equally important since reaction time will greatly influence the final distribution of components in a reaction mixture. Such is the case with the tertiary amines, and also with DIPA. While the reaction with $H_2S$ is rapid, the reaction with $CO_2$ is slow. Therefore, although consideration of reaction equilibrium alone would suggest that both $H_2S$ and $CO_2$ could react almost to completion, when the reaction kinetics are considered, only the $H_2S$ reaction approaches completion, while the $CO_2$ reaction goes only part way. Selective absorption of $H_2S$ can therefore be improved by limiting contact time. The mechanical design of contacting equipment, the operating conditions, and the presence of special chemical promoters can all have a bearing on selectivity of tertiary amines for $H_2S$ over $CO_2$.

The popular amines MEA, DEA, MDEA, DGA, and DIPA all have in common a trivalent nitrogen atom to which are attached alcohol radicals (either ethanol or propanol). For example, the primary amine, monoethanol amine, has one ethanol group and two free hydrogen atoms. The secondary amine, diethanol amine, has two ethanol groups (as the name suggests) and one hydrogen atom. DGA has a single ether-ethanol chain with two hydrogens. MEA, DEA, and DGA all react rapidly with carbon dioxide, combining with the available proton of the amine molecule to form a carbamate radical (see FIG. 1). DIPA, which has two propanol structures and a single hydrogen atom, is not fully substituted, and is therefore not a tertiary amine. DIPA does not exhibit the rapid reaction with $CO_2$ that is characteristic of the primary and secondary amines, each of which have an available proton. Apparently, the proton is not available for reaction with $CO_2$, so the carbamate reaction does not occur readily with DIPA. Other amines, the so called hindered amines use the physical structure of the amine molecule to block accessibility of $CO_2$ to the reactive hydrogen. Methyl diethanol amine (MDEA) is a tertiary amine which has no proton attached to the nitrogen atom. As the name suggests, the three valences of nitrogen are occupied by two ethanol groups and one methyl group, so the carbamate reaction, which requires a labile proton, cannot occur.

The reaction between a molecule of MDEA and a molecule of $CO_2$ is somewhat more complex. When a $CO_2$ molecule is dissolved in an aqueous solution, due to its acid nature it hydrolyzes to form carbonic acid ($H_2CO_3$). In a process which occurs slowly, the carbonic acid then dissociates to form positive hydrogen ions and negative bicarbonate ions. The bicarbonate may, to some extent, dissociate further to form additional positive hydrogen ions and negative carbonate ions. The MDEA molecule, being mildly basic in character, will bond loosely with the available hydrogen ions to form a positively charged amine-hydrogen ion that coexists in solution with negatively charged bicarbonate and carbonate ions (see FIG. 2). Since the carbonic acid dissociation step is relatively slow kinetically, the overall sequence of steps must also proceed slowly. The overall kinetic acid-base reaction between tertiary amines and carbon dioxide must therefore occur quite slowly. In contrast, the acid-base reaction of hydrogen sulphide occurs rapidly. In typical contacting devices, the $H_2S$ reaction rate is at least ten times faster than the $CO_2$ reaction. These differential rates of reaction help to explain the selectivity of tertiary amines for $H_2S$ over $CO_2$.

As the reaction between the amine and acid gas proceeds, more of the available amine molecules become bound to acid gas molecules, leaving fewer unreacted amine molecules available to react with the acid gas. This lack of available reactive amine molecules in the presence of acid gas slows the rate of reaction. Solution loading is therefore another factor influencing the selectivity of tertiary amines for $H_2S$.

Reaction kinetics, however, is only one factor to consider in analyzing the absorption of acid gases by amine solutions. As in physical absorption, acid gas molecules must migrate to the gas liquid interface under the action of the concentration gradient that exists in the gas film adjacent to the interface. The molecule must then penetrate the interface and migrate inward until an unreacted amine molecule is encountered. As the mass transfer of acid gas molecules from the bulk gas phase into the liquid phase occurs by diffusion, the process of transfer requires a finite amount of time. Diffusion in this case occurs in two sequential steps. First, diffusion through the gas phase occurs near the interfacial boundary at the gas diffusion rate and, second, diffusion through the liquid phase occurs near the liquid boundary of the interface at the liquid diffusion rate. As a rate determining factor for tertiary amines, mass transfer by diffusion must be considered in addition to chemical rates of reaction. It has also been observed that selectivity for $H_2S$ increases as contact pressure decreases.

As previously mentioned, $H_2S$ reacts almost instantly with amine, so mass transfer by diffusion through the gas phase is the rate-limiting step for hydrogen sulphide. For carbon dioxide, the dissociation to form hydrogen and bicarbonate ions proceeds so slowly that the concentration gradient in the liquid phase that drives the mass transfer is impeded. This impedance constitutes an additional resistance to absorption of $CO_2$.

For many reactions the temperature at which the reaction takes place has a profound effect on the rate at which the reaction occurs. This is particularly true of the reaction between $CO_2$ and tertiary amines during absorption where a reduction in temperature of even a few degrees can significantly slow the rate at which the $CO_2$ and amine react. The $H_2S$ reaction however is not as dramatically effected by a reduction in reaction temperatures, and this characteristic can be used to increase the differential rates of reaction between the two acid gases and thus increase the amines selectivity for $H_2S$. By slowing the rate of the $CO_2$ reaction by reducing the temperature in the absorber the "slipping" of $CO_2$ can be increased without significantly affecting the absorption of $H_2S$.

Obviously, one way to reduce the operating temperature of the absorber is to reduce the temperature of the streams feeding into the absorber. The reaction of acid gas with amine is exothermic however, and in some cases considerable amounts of heat can be generated by the reaction within the absorber itself. So even though the feed streams to the absorber are relatively cool, the heat of reaction will create a bulge in the temperature profile somewhere in the midsection of the tower. One way to mitigate this bulge is to use a more dilute amine solution so that the greater mass of the solution will attenuate the temperature rise. A more direct way to reduce the temperature bulge is to use inter-stage cooling on a stage near the peak of the temperature bulge. This will reduce the contact temperature throughout the tower which will in turn slow the $CO_2$ reaction and will improve the amine's selectivity for $H_2S$.

The extent of reaction between acid gas and amine is the product of the rate of reaction and the contact time of the reactants. Slowing the rate of reaction will improve the amines affinity for $H_2S$ over $CO_2$. Reducing the contact time between the reactants will have a similar effect. The object should be to choose a type of contact device that can absorb $H_2S$ to meet the required specification in the briefest possible time so as to prevent the $CO_2$ reaction from proceeding any further than necessary. The choice of an efficient multistage contacting device, whether it be conventional trays, random packing, structured packing or equivalent, can also have a significant effect on the selectivity of the amine for $H_2S$.

Practical applications for the selectivity of tertiary amines for $H_2S$ over $CO_2$ have, for the most part, been limited to absorption of acid gases from natural gas in a primary absorber (see FIG. 3 which shows a standard arrangement). Circulation rate and residence time in the absorber permit a portion of the $CO_2$ to remain unabsorbed while $H_2S$ is totally removed from the gas. Commercial specifications for natural gas require near to total removal of $H_2S$, but in most cases up to 2% carbon dioxide in the purified gas is acceptable. The tertiary amine, methyldiethanol amine (MDEA), is usually the preferred absorbent. The practice of partially removing $CO_2$ from the natural gas is referred to as "slipping" the $CO_2$.

In the technical record, references to MDEA's preferential affinity for $H_2S$ over $CO_2$ appear as early as 1950, when Frazier and Kohl first noted the phenomena (see Is Frazier, H. D. and A. L. Kohl, "Selective Absorption of Hydrogen Sulfide from Gas Streams", Ind. Eng. Chem., 42, 2258–2292 (1950)). Since then, the technical literature has traced the development of design methods for the use of MDEA. By the 1980's MDEA had gained widespread use in the gas industry, but applications were generally restricted to the relatively simple operation of slipping a portion of the $CO_2$ in the high pressure absorber while totally absorbing the $H_2S$. The formidable challenges of quantitatively predicting the combined chemical reaction and mass transfer relationships were not met until recent years, and although present methods are adequate, there is still significant room for improvement.

Present methods involve computational procedures to establish both chemical and mass transfer equilibrium relationships between the amine and the acid gases. The concentrations of the various chemical species seek to arrive at final equilibrium concentrations at which point no further change will occur. It is the difference between actual concentrations and equilibrium concentrations that provides the driving force for change to occur. Because there are various resistances to these changes, change does not to occur instantaneously; it occurs at a definite rate determined by the nature of the components, and by process conditions. Rate of change is proportional to driving force and inversely proportional to resistance, so if driving force and resistance can be calculated, the rate of change can also be calculated. If infinite time were available, equilibrium concentrations would eventually be attained. In reality, however, time constraints dictate that only a partial approach to equilibrium is attainable. This procedure forms the basis for the design of processing equipment to preferentially absorb $H_2S$ from gases containing a mixture of both $H_2S$ and $CO_2$.

Since $H_2S$ proceeds toward equilibrium rapidly, it approaches equilibrium more closely than $CO_2$, which proceeds slowly. In real absorbers, equilibrium can be approached, but is never attained. In a multistage contacting device such as a trayed tower, if each actual stage had sufficient time to reach equilibrium, the stages would be said to be 100% efficient. This hypothetical scenario provides a measure of the change that takes place on each actual stage if the actual change is expressed as a percentage of the change that would take place if equilibrium were attained. The actual change taking place on the stage could then be calculated from the known 100% efficiency of the stage if equilibrium is attained. For example, in a typical trayed MDEA absorber, the tray efficiency for $H_2S$ is approximately 50%, whereas the tray efficiency for $CO_2$ is typically about one-tenth as much, or 5%. If this preferential effect is factored into multiple stages of contact, the separation of $H_2S$ from $CO_2$ can be significant. In practical situations, however, it must be recognized that the final concentration of $H_2S$ in the treated gas must be very low, while the concentration of $CO_2$ is many times higher. The driving force for absorption of $H_2S$ is low, while the driving force to absorb $CO_2$ is relatively high in the top trays of the absorber tower. This means that, in the process of absorbing essentially all of the $H_2S$, significant quantities of $CO_2$ will inevitably also be absorbed, and that the rich MDEA exiting from the bottom of the absorber column will contain a large amount of $CO_2$ along with the absorbed $H_2S$.

Over the years various schemes have been proposed to improve the selectivity of tertiary amines for $H_2S$ over $CO_2$, but unless the true complexity of the absorption process is recognized, the success of these schemes will be compromised. For example, many schemes attribute to the tertiary amines a strong similarity to physical absorption, in which acid gases are absorbed or desorbed in response to changes in pressure or temperature. Physical absorbents generally follow the principle of Henry's Law, which states that the concentration of a distributed component in the liquid phase is proportional to the partial pressure of the component in the gas phase. Due to chemical reactions that inevitably occur in the amine solution, amines do not behave in this manner. When the chemical bond between the amine and the acid gas is formed, it is not easily broken. Attempts to desorb the acid gases by pressure reduction, gentle heating, or gas stripping will therefore have only limited success. The only way to release significant amounts of acid gas from the amine solution is to break the chemical bond by vigorous steaming of the solution in the amine regenerator. Some proposed process schemes are based on mild partial regeneration to create a semi-lean amine solution, which because it is supposedly already loaded with $CO_2$, will resist further absorption of $CO_2$, and absorb $H_2S$ instead. Such schemes have not gained wide acceptance.

SUMMARY OF THE PRESENT INVENTION

According to a first aspect of the invention there is provided a method of selective absorption of hydrogen sulfide relative to carbon dioxide from a supply gas stream comprising:

providing a supply gas stream containing at least a product gas, hydrogen sulfide and carbon dioxide;

providing an absorbent which absorbs both hydrogen sulfide and carbon dioxide while exhibiting preferential affinity for hydrogen sulfide relative to carbon dioxide;

generating a stream of the absorbent which moves from a lean condition in countercurrent flow over a series of contact stages to a stream of the supply gas so as to contact the absorbent with the supply gas stream so as to absorb at least partly the hydrogen sulfide and the carbon dioxide to form a rich absorbent while generating a stream of sweetened product gas which contains levels of hydrogen sulfide and carbon dioxide below a predetermined maximum allowable value;

passing the rich absorbent through a regeneration process which strips substantially all of the hydrogen sulfide and carbon dioxide from the rich absorbent returning the absorbent to the lean condition for said stream while generating a stream of the hydrogen sulfide and carbon dioxide;

wherein the absorption of the hydrogen sulfide and carbon dioxide by the absorbent is carried out in two steps in which:

in a first operation the absorbent in lean condition is contacted with the supply gas stream;

and in a second operation the selectivity for hydrogen sulfide relative to carbon dioxide is enhanced by contacting the rich absorbent leaving the first operation with a second gas which has a higher ratio of hydrogen sulfide relative to carbon dioxide than the supply gas stream so as to cause the already rich absorbent to become even more heavily loaded with hydrogen sulfide and carbon dioxide, but because of the high ratio of the second gas, the increased loading is preferentially in favor of hydrogen sulfide.

Preferably the source of the second gas is the stream of the hydrogen sulfide and carbon dioxide from the regenerator, a portion of which is recycled back to the second operation, where the stream of the hydrogen sulfide and carbon dioxide contains approximately the same ratio as existed in the rich absorbent after the second operation.

Preferably the contact with the second gas in the second operation occurs counter currently over a series of contact stages.

Preferably the first and second operations take place in the same countercurrent absorption column which operates throughout at substantially the same pressure.

Preferably lean amine entering at the top of the upper section of the column comes in contact with sour gas containing both $H_2S$ and $CO_2$ which enters the column at an intermediate stage in the mid section of the absorber at the point where the first operation interfaces with the second operation, wherein the first operation occurs in the upper section of the column and the second operation occurs in the lower section such that the combined actions of the first and second absorption operations will attain an internal balance in which the rich amine leaving the base of the column will be enriched in $H_2S$, while the $CO_2$ thus excluded from the rich amine solution will exit from the top of the column along with the sweetened product gas from which the $H_2S$ has been removed.

Preferably there is provided a single feed of the lean absorbent at a top of the first operation.

Preferably there are provided a plurality of feeds of the lean absorbent at different positions through the first and second operations.

Preferably the first and second operations take place in at least two different absorber towers operating at different pressures.

Preferably the first operation takes place substantially wholly in the first tower which operates at a higher pressure than the second operation in the second tower.

Preferably the second absorber tower is arranged to control the amount of carbon dioxide in the sweetened product gas from the first tower by taking greater advantage of the natural preference of the absorbent for hydrogen sulfide to effect "slipping" in which a portion of the carbon dioxide is permitted to exit with the sweetened product gas.

Preferably the method includes contacting the gas in the upper section of the second tower with a stream of the absorbent in lean condition that is fed at a top stage of the second tower such that the lean absorbent, having a very low residual hydrogen sulfide content, is capable of removing essentially all of the hydrogen sulfide from the acid gas stream, producing an overhead carbon dioxide vapour that is almost entirely free of hydrogen sulfide.

Preferably the method includes interposing a flash drum in the feed stream of rich upstream absorbent where the reduced pressure of the flash drum allows light dissolved vapors to evolve and be removed from the absorbent.

Preferably the first and second operations in the first and second towers are arranged such that the partially loaded absorbent from the upper stages of the second absorber combine with the rich absorbent from the first tower and flow downward to the lower stages of the second tower and wherein the overall operation of the first and of the second towers reaches an internal balance in which the rich absorbent leaving the bottom of the second tower is enriched in hydrogen sulfide, while the carbon dioxide thus excluded from the absorbent exits from the top of the second tower as a water saturated carbon dioxide stream essentially free of hydrogen sulfide.

Preferably providing a plurality of lean absorbent feed points on both the first and second towers in order to optimize selectivity of the amine for hydrogen sulfide under varying operating conditions.

Preferably the source of the second gas stream is a portion of the hydrogen sulfide enriched acid gas overhead from the absorbent regenerator, which is recycled back to the second tower.

Preferably there is provided a first and a second tower wherein the acid gas product from said regenerator and a portion of the rich amine from the first absorber tower are sent to a third absorber tower and rich amine from the base of the third absorber tower is sent to a second regenerator which produces an overhead acid gas in which the $H_2S$ is more concentrated than the acid gas from the first regenerator and wherein a portion of the enriched acid gas from the second regenerator is recycled to the base of the third absorber tower where it is contacted with a side stream of rich amine from the first absorber tower, which enters at a mid section of the third absorber tower, and by lean amine that enters at a top of the third absorber tower, producing an overhead stream of essentially pure $CO_2$ and water vapor from the third absorber tower.

Preferably a first effect followed by a second effect which by using multiple stages of absorption and regeneration is able to produce an acid gas that is progressively richer in $H_2S$ wherein the staging process is continued to a third effect or more by adding additional stages of absorption and regeneration and wherein each additional stage of absorption receives acid gas and rich amine from preceding effects and produces a stream of $CO_2$ and rich amine which when regenerated produces an enriched acid gas, a portion of which is recycled back to its absorber.

Preferably the lean amine for the first absorber tower is drawn from a stage in the regeneration process above a reboiler while the lean amine for the second absorber tower is drawn from the bottom of the regenerator proces in order to meet the differing tolerances of the first and second absorber towers for residual acid gas in the lean amine.

Preferably it is desired to maximize recovery of $CO_2$ as a by-product by minimizing slipping $CO_2$ in a first absorber tower by adjusting operating conditions, solution concentration, circulation rate, type of contacting device and stages of contact so as to increase $CO_2$ absorption in the first absorber tower thus enabling increased $CO_2$ production in subsequent absorber towers.

Preferably side coolers are used on absorbers to cool the process and to reduce the rate of the $CO_2$ reaction with amine.

According to a second aspect of the invention there is provided a method of selective absorption of hydrogen sulfide relative to carbon dioxide from a supply gas stream comprising:

providing a supply gas stream containing at least a product gas, hydrogen sulfide and carbon dioxide;

providing an absorbent which absorbs both hydrogen sulfide and carbon dioxide while exhibiting preferential affinity for hydrogen sulfide relative to carbon dioxide;

generating a stream of the absorbent which moves from a lean condition in countercurrent flow over a series of contact stages to a stream of the supply gas so as to contact the absorbent with the supply gas stream so as to absorb at least partly the hydrogen sulfide and the carbon dioxide to form a rich absorbent while generating a stream of sweetened product gas which contains levels of hydrogen sulfide and carbon dioxide below a predetermined maximum allowable value;

passing the rich absorbent through a regeneration process which strips substantially all of the hydrogen sulfide and carbon dioxide from the rich absorbent returning the absorbent to the lean condition for said stream while generating a stream of the hydrogen sulfide and carbon dioxide;

wherein the absorption of the hydrogen sulfide and carbon dioxide by the absorbent is carried out in two steps in which:

in a first operation the absorbent in lean condition is contacted with the supply gas stream;

and in a second operation the selectivity for hydrogen sulfide relative to carbon dioxide is enhanced by contacting the rich absorbent leaving the first operation with a second gas which has a higher ratio of hydrogen sulfide relative to carbon dioxide than the supply gas stream so as to cause the already rich absorbent to become even more heavily loaded with hydrogen sulfide and carbon dioxide, but because of the high ratio of the second gas, the increased loading is preferentially in favor of hydrogen sulfide;

wherein the first and second operations take place in first and second different absorber towers where the second absorber tower operates at a pressure lower than the first and lower than the regeneration process and wherein there is provided a liquid pump for pressurizing the absorbent from the second absorber tower for supply to the regeneration process.

The process described herein recognizes that co-absorption of $CO_2$ and $H_2S$ by tertiary amines is essentially unidirectional and that, short of vigorous regeneration of the rich solution by steaming, desorption of acid gas from rich solution is not significant. Absorption responds to partial pressures, solution loading, and temperature. However, because the chemical bond formed during absorption cannot be easily broken, in practical situations desorption will not respond to these measures.

The present process is most applicable to situations where the $CO_2/H_2S$ ratio in the natural gas (indicated by reference numeral 10 in FIGS. 4 through 8) that feeds into the plant is relatively high. In this scenario, the rich amine solution exiting the high pressure absorber would also have a relatively high ratio of $CO_2$ to $H_2S$, even if $CO_2$ slipping was maximized. In addition, because regeneration strips essentially all of the acid gas from the solution, the regenerator overhead vapour in a conventional MDEA plant would also have a high $CO_2$ to $H_2S$ ratio. This process described herein proposes to improve this ratio by recycling an acid gas slip stream, which is rich in $H_2S$, to contact the rich amine prior to regeneration where, because of the higher partial pressure of $H_2S$ in the recycled acid gas, further absorption of $H_2S$ into the rich solution can occur. The source of the $H_2S$ enriched acid gas is the overhead vapour from the regenerator. If a sufficient portion of this overhead vapour is recycled, the rich amine solution will be enriched in $H_2S$ and, since the regeneration process strips essentially all acid gas from the rich solution, the regenerator overhead vapour will also be $H_2S$-enriched. A portion of this enriched overhead vapour is recycled back to enrich the amine solution, and the entire system will come to a new dynamic equilibrium based on these new conditions, resulting in regenerator overhead vapours having a significantly higher proportion of $H_2S$ over $CO_2$.

In summary, the following process concepts form the basis of the process described herein.

(1) Tertiary amines exhibit a preferential affinity for $H_2S$ over $CO_2$ primarily because of differing rates of absorption. Therefore, when $H_2S$ and $CO_2$ are coabsorbed from gases, the relative proportion of $H_2S$ to $CO_2$ in the amine will be higher than the corresponding proportion in the gas phase. This is because in the actual processing equipment $H_2S$ is absorbed more rapidly than $CO_2$.

(2) Absorption of acid gas by amine involves physical absorption plus chemical reaction. Absorption occurs readily, but desorption to separate the acid gas from the amine is much more difficult because the reaction that bonds the acid gas chemically to the amine is not easily reversed except by intense steaming at elevated temperature. Mass transfer of acid gas is therefore essentially unidirectional throughout most of the process except for the regeneration where the chemical bond that links acid gas to amine is broken by steaming the rich solution. After regeneration the amine is totally stripped of all acid gas except for very minor residual amounts.

(3) Rich tertiary amine in contact with sour gas will be loaded with both $H_2S$ and $CO_2$ in proportions dictated by the ratio of $H_2S$ to $CO_2$ in the gas phase, by the contact time and by the conditions of contact. While the rich solution does not readily give up its acid gas short of vigorous regeneration, it is possible to more fully load the rich solution with $H_2S$ when the solution is in contact with a gas which is enriched with $H_2S$ at the proper operating conditions.

(4) If the tertiary amine is initially contacted with gas that is relatively lean in $H_2S$ but rich in $CO_2$, the $H_2S$ will be totally absorbed, but a portion of the $CO_2$ will remain unabsorbed and will not be removed from the gas. This is referred to as "slipping" a portion of the $CO_2$. If the rich amine from the first contact is then contacted with the second gas that is richer in $H_2S$ than the first gas, then the rich amine is capable of absorbing additional $H_2S$ from the second gas, provided that concentrations and operating conditions are favourable.

However, the rich amine which contacts the second gas is not capable of totally removing the $H_2S$ from the second gas because it is already partially loaded with $H_2S$. Equilibrium conditions between the rich amine and the second gas will permit only partial absorption of the $H_2S$, but will not permit total removal. Thus, while slipping $CO_2$ from the second gas, a portion of the $H_2S$ will also be unavoidably slipped while in contact with the rich amine. In order to pick up the slipped $H_2S$ from the second gas, the second gas must be contacted with lean amine which is sufficient to absorb the $H_2S$ but will continue to allow the $CO_2$ to slip. The second gas, after being contacted by both rich and lean amine streams, will consist of substantially pure $CO_2$ and water vapour with only a trace of $H_2S$ remaining.

(5) Based on the principles described in (4) above, it is possible to extend the enrichment method by devising a multistage enrichment system wherein the acid gas is progressively enriched in stages by contacting rich amine with recycled acid gases that are progressively richer in $H_2S$ in a series of absorbers and regenerators.

(6) It is possible to realize some reduction in process heat required for regeneration of the rich amine solution by tailoring the acid gas residuals contained in the lean solution to suit the requirements of the individual absorbers. Absorbers with an extreme intolerance for acid gas residuals would be drawn from the bottom of the regeneration column where it would be exposed to the most intense degree of steaming. Absorbers with a greater tolerance for acid gas residuals could draw their lean amine from an intermediate stage in the column where the degree of regeneration heat is less. Overall, the two lean streams require less process heat than producing a single lean stream with very low residuals.

(7) Recognizing that it is primarily the differential rates of reaction between the acid gases $H_2S$ and $CO_2$ with tertiary amine that creates the preferential affinity of amines for $H_2S$, methods to control the rates of reaction and the extent of reaction will improve selectivity for $H_2S$. Reducing the temperature of absorption and reducing the contact time of the acid gas with the amine will both enhance selectivity for $H_2S$.

The above described principles recognize the physical and chemical nature that is inherent in tertiary amines. By employing these principles in combination it is possible to devise a process that will greatly enrich the $H_2S$ concentration of the acid gas feed to a sulphur plant. It should also produce a secondary benefit of producing a side stream of essentially pure $CO_2$ which may also have commercial value.

BRIEF DESCRIPTION OF THE DRAWING FIGURES

Embodiments of the invention will now be described, by way of example only, with reference to the accompanying drawings, wherein:

FIG. 1 illustrates a carbamate reaction of an amine and carbon dioxide;

FIG. 2 illustrates a series of CO2-tertiary amine reactions resulting in a positively charged amine-hydrogen ion;

Figure 5:
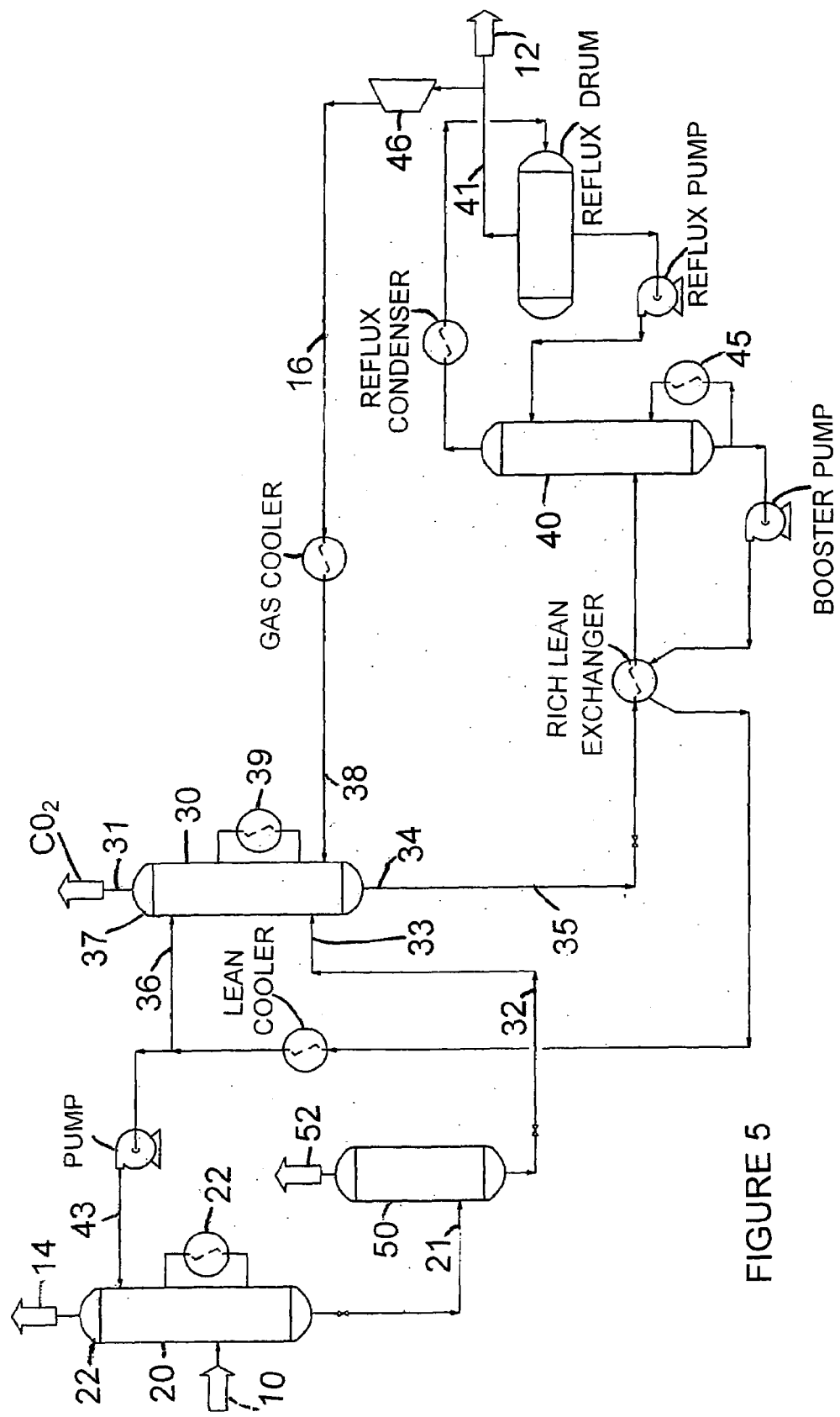
Figure 6:
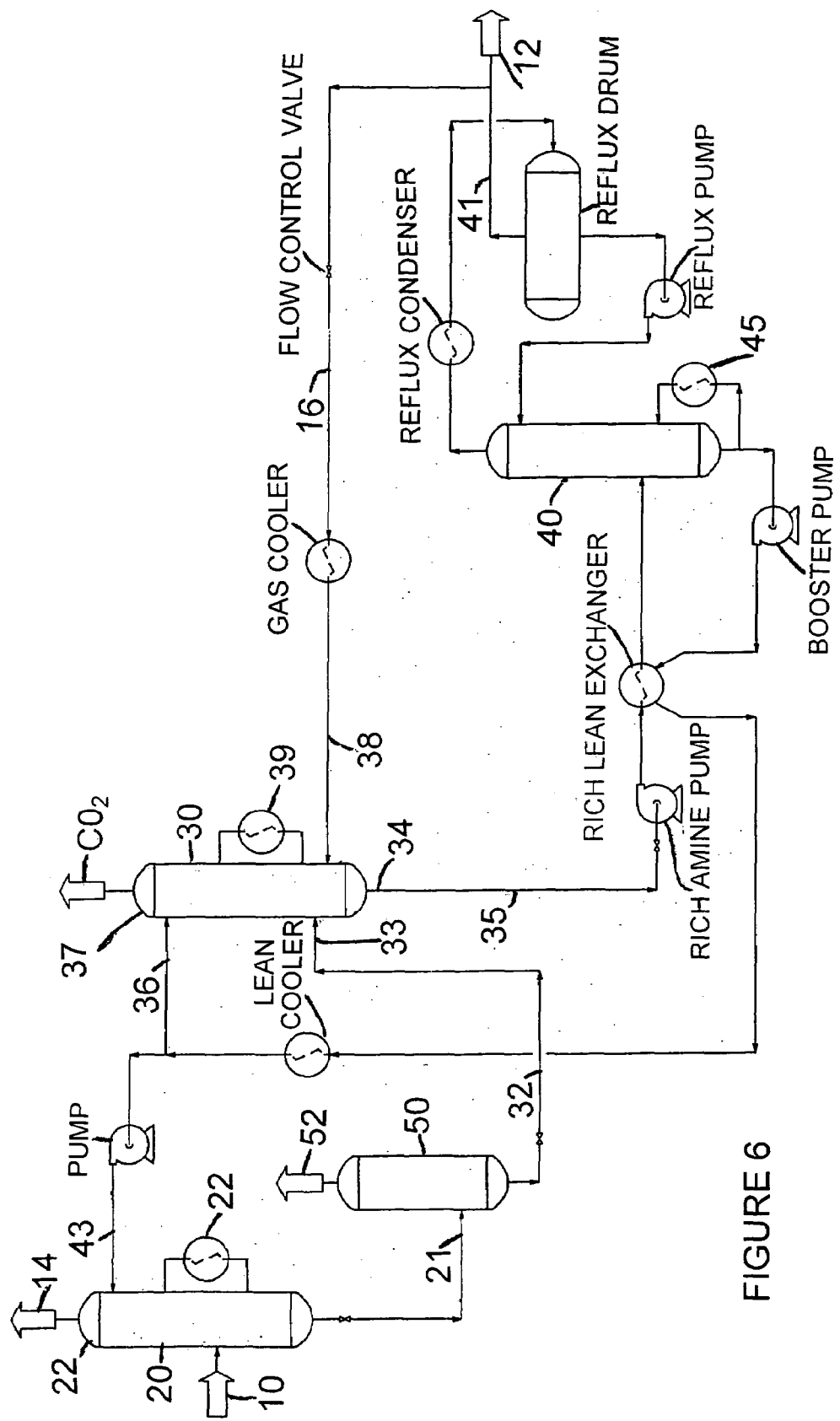
Figure 7:
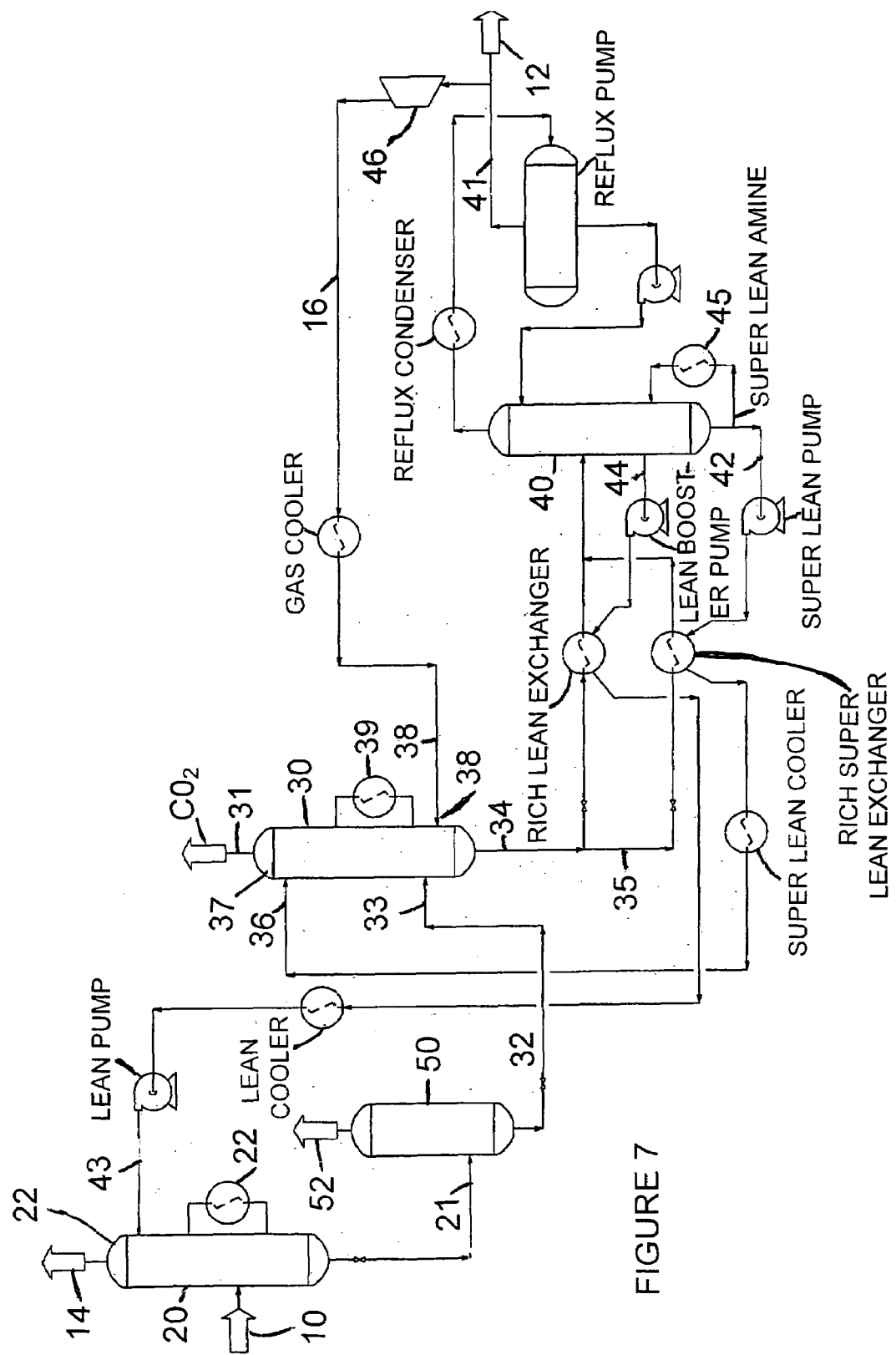
Figure 8:
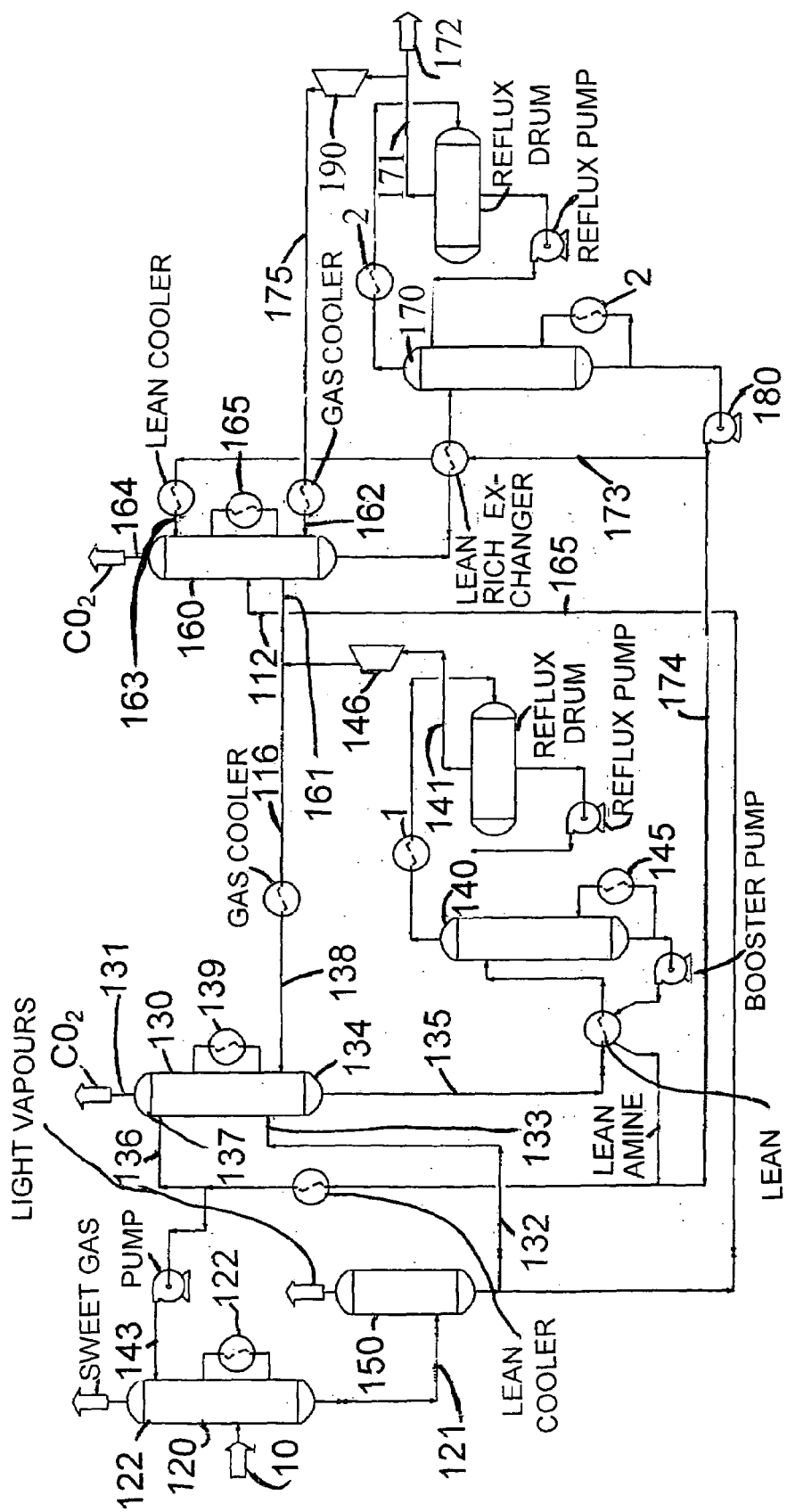

FIG. 5 shows a "single effect" acid gas enrichment process according to another embodiment of the present invention in which the second absorber operates at a pressure intermediate between the first absorber and the regenerator; and, FIG. 6 shows a "single effect" acid gas enrichment process according to another embodiment of the present invention in which the second absorber operates at a pressure lower than the pressure of the regenerator; and, FIG. 7 shows a "single effect" process with a lean/superlean system according to a further embodiment of the present invention; and, FIG. 8 shows a "double effect" acid gas enrichment process according to yet another embodiment of the present invention.

DESCRIPTION OF THE PREFERRED EMBODIMENT

Figure 3:
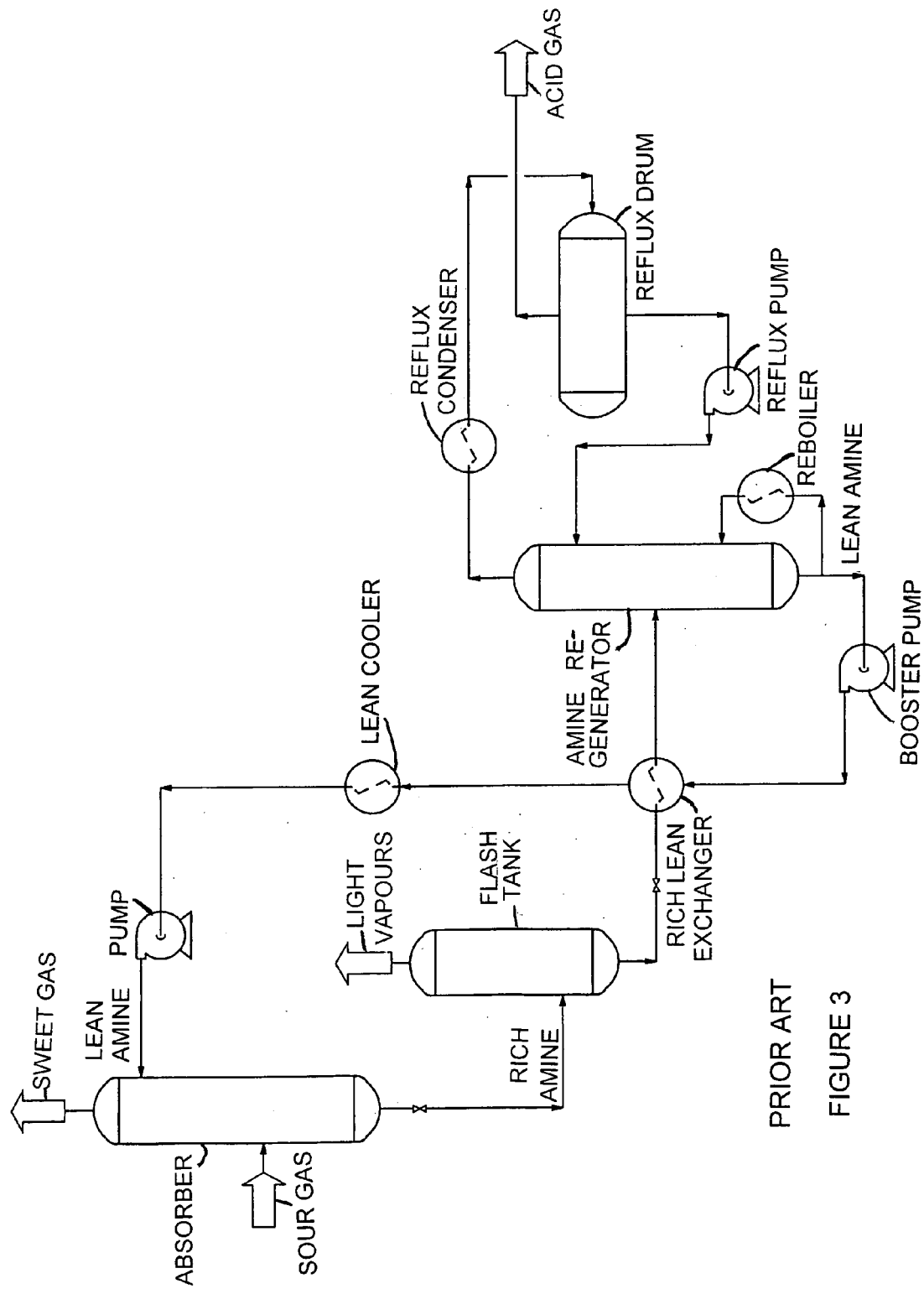
FIG. 3 shows a typical prior art amine process employing a primary absorber and regenerator.
Figure 4:
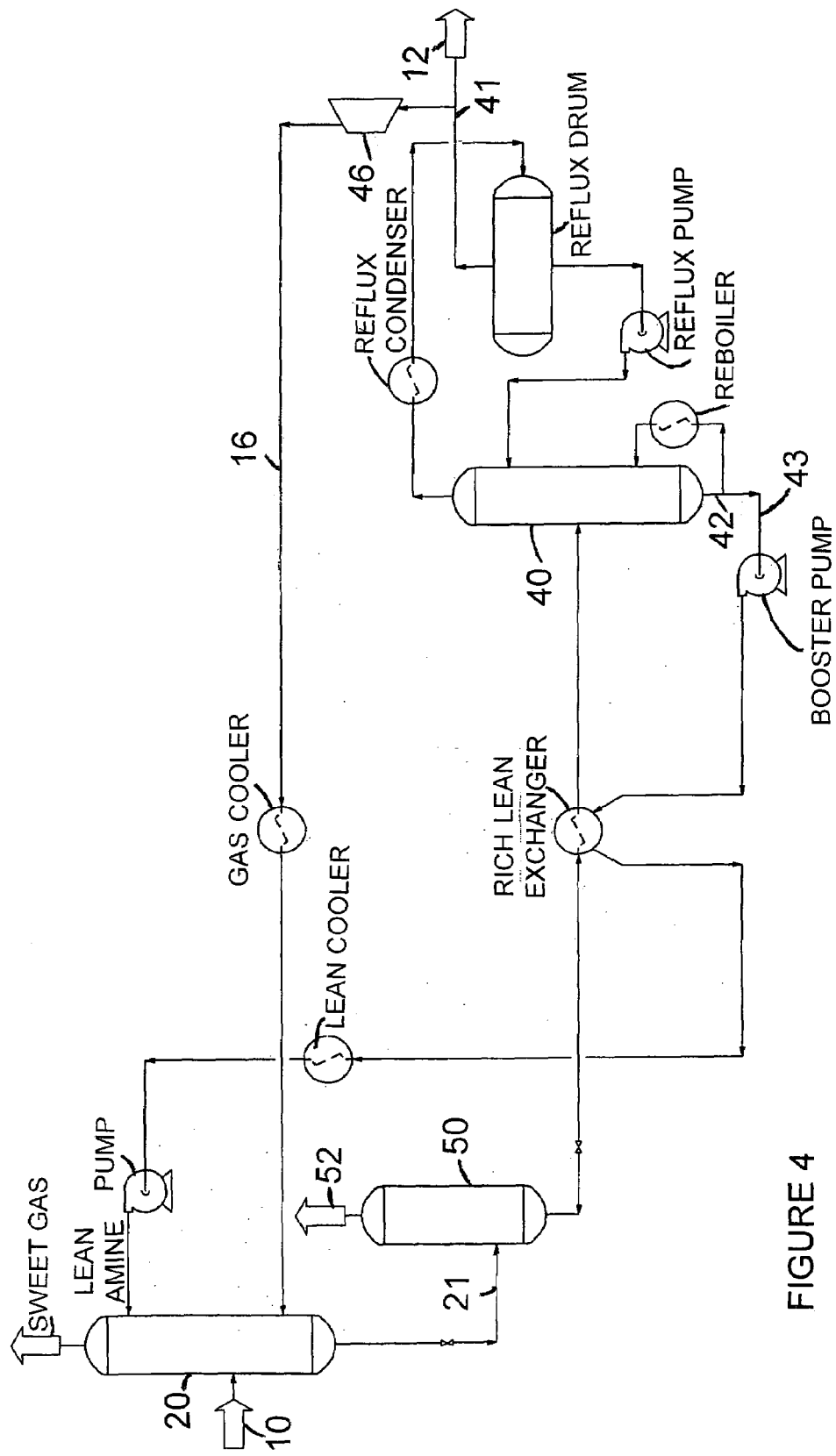
FIG. 4 shows a simple acid gas recycle process according to one embodiment of the present invention.

In one embodiment of the present invention shown in FIG. 4 the process recycles concentrated acid gas vapours back to the base of the high pressure amine absorber below the entry point of the sour feed gas for the purpose of increasing the concentration of $H_2S$ in the amine solution exiting the base of the column. The introduction of additional $H_2S$ into the absorber column, however, means that conditions in the upper section of the column must be altered in order to maintain $H_2S$ specifications of the product gas while slipping additional $CO_2$. The process scheme of FIG. 4 requires a high pressure compressor to recycle the acid gas.

In a second more practical embodiment of the present invention shown in FIG. 5, the process, sometimes referred to herein as a "single effect process", uses a second absorber column (indicated by reference numeral 30) which operates at a pressure that is intermediate to that of the main high pressure absorber tower 20, also referred to herein as the "first absorber", and the pressure of the amine regenerator 40. Acid gas 16 that is enriched in $H_2S$ is fed into the base of the second absorber column at 38 where it comes in contact is with rich amine 32 from the high pressure absorber 20 (which enters the second column 30 at 32) in counter-current flow over a series of contact stages in the second absorber 30. While the amine solution picks up additional $H_2S$ from the recycled acid gas the $CO_2$ loading does not change dramatically, resulting in a rich stream 35 exiting from the base of the second column at 34 that has been enriched in $H_2S$. Vapours rising above the feed tray, where rich amine from the high pressure absorber enters the second absorber at 33, will be in contact with a solution that is already significantly loaded with acid gas. As a consequence, these vapours will contain both $H_2S$ and $CO_2$. In order to achieve a useful separation in the second column 30, it is necessary to eliminate essentially all of the $H_2S$ from the overhead vapour so that it can either be disposed of, or marketed as an essentially pure $CO_2$ stream 31. This can be accomplished by introducing a lean stream of tertiary amine at 36 directly from the amine regenerator 40 onto the top tray of the second absorber. Because of its low residual concentration of acid gas, the lean stream will reduce the $H_2S$ in the overhead gas essentially to zero in the second absorber, leaving an overhead of essentially pure $CO_2$ and water vapour, plus remaining non-condensable hydrocarbons which were dissolved in the rich amine solution from the high pressure absorber 20.

The second column 30 has three feeds. Lean amine enters at the top of the column at 37, while rich amine from the high pressure absorber 20 enters at the midsection of the column at 32, while recycled acid gas enters at the column's base at 38. The overhead vapour stream 31—one of two streams leaving the second absorber consists mostly of $CO_2$ and water. The bottom liquid stream at 34 consists of rich amine enriched with $H_2S$. The lean amine stream 36 entering at the top of the column contacts the rising acid gas vapours counter-currently through several stages of contact where it preferentially absorbs $H_2S$, and allows a substantial portion of the $CO_2$ to slip past unabsorbed until it exits at the top stream 31 of the second column. At the rich amine feed stage at the mid-section 32 of the absorber, the lean stream 36, now partially loaded with acid gas, after entering the column flows from the upper section of the column and blends with the incoming rich amine feed. As the combined amine stream flows downward through the lower section of the second absorber, it preferentially absorbs $H_2S$ from the acid gases before exiting from the base 34 of the column.

In another aspect of the present process a flash tank 50 may be added to the system by locating it between the high pressure absorber 20 and the second absorber 30. The tank's purpose is to flash off non-condensable vapours, namely principally methane and ethane, which are picked up in small quantities in the high pressure absorber where the amine acts as a physical solvent for hydrocarbons. These hydrocarbons are largely flashed off in the flash tank, along with minor amounts of $H_2S$ and $CO_2$. This flash vapour, exiting at 52, can also be sweetened and used as plant fuel. The purpose of the flash tank is to remove non-condensable vapours that would otherwise appear in the overhead vapour 31 from the second absorber 30, contaminating the $CO_2$.

Another aspect of the process may employ side coolers 22 and 39 in certain cases where heat build-up in the absorbers detrimentally affects the selective absorption of $H_2S$ over $CO_2$.

The process described herein is based on recycling a portion of the overhead acid gas stream from the regenerator 40 for the purpose of improving the ratio of $H_2S$ to $CO_2$ in the acid gas stream 12 going to the sulphur plant. Carbon dioxide, which is an undesirable contaminant in the sulphur plant, is excluded at two points in the process. First, the $CO_2$ is only partially absorbed in the high pressure absorber 20, allowing a portion of the $CO_2$ to slip and remain in the residue gas, namely the "sweet gas" 14. Second, $CO_2$ is slipped by the amine in the second absorber 30, where it is removed overhead at 31 as essentially pure $CO_2$ saturated with water, When the overall plant material balance for $CO_2$ is calculated, the concentration of $H_2S$ in the overhead stream 41 from the regenerator 40 should be greatly increased, significantly improving its quality as a sulphur plant feed and improving the conversion of $H_2S$ to sulphur in the sulphur plant.

Lean tertiary amine that leaves the regenerator 40 is split into two streams, namely a first stream 43 which flows to the top of the high pressure absorber 20, and a second stream 36 which flows to the top of the second absorber 30. The first stream 43 is sufficient to produce a sweet natural gas product, and the second stream 36 is used to sweeten recycled acid gas for the purpose of improving $H_2S$ concentration in the feed 12 to the sulphur plant. This internal recycle system consisting of recycled enriched acid gas 16 requires additional lean amine 36, additional heat to regenerate the additional amine in reboiler 45, and additional pumping and acid gas compression at 46 to recycle the internal streams. With this approach, additional process costs will be incurred in improving the $H_2S/CO_2$ ratio of the acid gas 12 leaving the plant, but these costs are reasonable and practical for most systems. However, with very lean streams, the acid gas ratio in the rich amine 21 from the high pressure absorber 20 will become increasingly unfavourable, and a greater and greater portion of the overhead regenerator vapour 41 must be recycled in order to gain a significant improvement in the concentration of $H_2S$ in the acid gas stream 12 leaving the plant. In this case, the recycle stream 16 and the lean amine stream 36 going to the second absorber 30 become the dominant elements in the plant, resulting in progressively higher process costs for reabsorbing and regenerating recycled streams.

FIG. 6 shows a variation of the second embodiment referred to as the "single effect" process in which the second absorber tower (indicated by numeral 30) operates at a pressure that is lower than that of the regenerator. A pump is required to boost the rich amine stream 35 from the low pressure of the second absorber to the higher pressure of the regenerator, indicated by numeral 40. The recycled acid gas stream 16 flows to the second absorber and enters the tower at 38 and a flow control valve serves to reduce the pressure of the recycled acid gas from regenerator pressure to the lower pressure of the second absorber. With the exception of the changes described above, the numbering system and the process description of FIG. 5 also applies to FIG. 6.

Lean/Super Lean Amine Systems

It has been stated that in order to remove virtually all of the $H_2S$ from a sour gas stream 10 while allowing a portion of the $CO_2$ to slip through an absorber, the lean amine solution must be stripped in a regenerator to a very low residual $H_2S$ content. An $H_2S$ content of 0.0015 mole percent is a typical $H_2S$ residual for lean 50% (weight) MDEA. If residual $H_2S$ rises much above this level, the $H_2S$ content in the gas exiting the top of the absorber will exceed acceptable limits. It has been found that the high pressure absorber 20 is much more tolerant of residual $H_2S$ than the low pressure secondary absorber 30, even though the specification for $H_2S$ in the gas from the high pressure absorber is much tighter than the specification for the low pressure absorber. The high pressure absorber can tolerate more residual $H_2S$ because it has a much higher partial pressure driving force to cause $H_2S$ to diffuse through the gas film at the liquid interface and into the body of the amine liquid. The low pressure absorber must function with a much lower $H_2S$ partial pressure in the gas phase at the top of the column with the result that even modest amounts of residual $H_2S$ in the lean amine inevitably create such resistance to diffusion that final traces of $H_2S$ will not be absorbed and significant amounts of $H_2S$ will break through with the gas exiting from the top of the second absorber.

In order to meet the strict requirements for low residual $H_2S$ in the lean amine entering the second absorber 30 (which operates at a lower pressure than the first absorber 20), it is necessary to create a super lean amine by expending extra heat energy in the regenerator. The first absorber requires low residual $H_2S$, but because of its higher operating pressure, can tolerate residuals which are typically about five to ten times higher than those required for the low pressure absorber. Moderate steam stripping in the regenerator 40 is adequate to produce lean amine for the high pressure absorber, but for the low pressure second absorber intense steam stripping is necessary to produce a super lean tertiary amine having the required extremely low residual $H_2S$ content. In a simple system, the single bottom product leaving the amine regenerator has been stripped of $H_2S$ to the level necessary to meet the needs of the low pressure absorber, even though the high pressure absorber can tolerate a much higher level of $H_2S$ residual in the lean solution.

The different requirements for lean amine purity for the two absorbers suggest an alternate arrangement for regenerating the amine solution. Instead of drawing all of the lean amine from the base of the regenerator still column, the lean amine for the high pressure absorber can be drawn from an intermediate tray approximately five stages above the reboiler 45 located at the base of the column as shown in FIG. 7. The portion of lean amine drawn from the intermediate tray will have residual $H_2S$ low enough to meet the needs of the high pressure absorber, while the balance of the amine remaining in the regenerator still column will continue to downflow over the trays in the lower section of the column where it is subject to the intense steaming necessary to regenerate a super lean solution suitable for the low pressure absorber. The two draw-off points in the still column serve to reduce the overall process heat necessary to regenerate the solution. Instead of expending the energy required to regenerate the total amine solution to the standard of purity required by the low pressure absorber, a lesser amount of energy is expended to regenerate a conventional lean amine for the high pressure absorber, plus a super lean stream for the low pressure absorber. This lean/super lean system is a relatively simple enhancement to the process that will improve overall energy efficiency.

The flow scheme for the lean/super lean system is illustrated in FIG. 7. In this third embodiment of the invention there are two amine streams exiting from the regenerator, namely a lean stream and a super lean stream. The lean stream 44 is drawn from an intermediate stage in the regenerator 40 that is several stages above the reboiler 45 but is below the feed stream 35 which comes from the second absorber 30. After leaving the regenerator, the lean stream 44 is cooled by flow through the rich/lean exchanger and the lean cooler after which it enters the first absorber as stream 43.

The super lean stream 42 exits from the bottom of the regenerator 40 in a customary manner and is pumped through the rich/super lean exchanger and the super lean cooler after which it enters the second absorber 30 as stream 36.

It is obvious that the process scheme described in FIG. 6 in which the second absorber operates at a pressure lower than the pressure of the regenerator could also apply to the lean-super lean process.

Also the use of side coolers on absorbers 22 and 39 may be beneficial in some cases in improving the process and in influencing the purity required for the lean solutions.

Extremely Lean Acid Gas

For extremely lean streams where, for example, the molar ratio of $H_2S$ to $CO_2$ in the rich amine stream from the high pressure absorber is 1% or less, yet another, or fourth, embodiment of the invention shown in FIG. 8 should be considered. Low molar ratios exist where, for example, $H_2S$ in the natural gas is 0.03%, while $CO_2$ is 5%. In spite of slipping $CO_2$ in the high pressure absorber, there will be a very strong predominance of $CO_2$ in the rich amine with a typical $H_2S/CO_2$ ratio of 1% or less. A 1% $H_2S/CO_2$ ratio as feed to a Claus sulphur plant following a conventional amine plant would be literally impossible to operate. Using the second embodiment of the invention (i.e. the single effect system) as described above, the $H_2S/CO_2$ ratio in the acid gas could be increased by a factor of about 5, or from 1% to 5%.

In applying the second embodiment of the invention to a system that is very low in $H_2S$, the acid gas recycled to the second absorber is still a comparatively lean gas, even though the $H_2S$ has been concentrated by, for example, a factor of five. As the proportion of acid gas recycled is increased, the gain in concentration of $H_2S$ appears to approach a limit beyond which the amount of process energy expended becomes impractical. In this case, $H_2S/CO_2$ ratio can only be improved by employing the fourth embodiment of the invention, namely a double effect system shown in FIG. 8.

Whereas the second embodiment of the invention may be referred to as a "single effect system", the fourth embodiment of the system may be referred to as a "double effect system", which involves coupling together two stages of low pressure absorption and regeneration. Components of the system in FIG. 8 which are the same or similar to those shown in FIG. 5 are identified with the same reference numerals, except with the addition of a prefix "1". The double effect system consists of all the basic component parts of the single effect system, including the high pressure absorber 120, the optional flash tank 150, the second absorber 130, the regenerator 140, a compressor 146 to recycle acid gas, and a means of pumping lean amine to the two absorbers. The double effect system adds to the basic system a third absorber tower 160, a second regenerator 170, an additional lean amine pump 180, and an acid gas compressor 190.

The double effect system attaches directly to the acid gas outlet 112 from the single effect system. The acid gas from the first regenerator enters near the base 161 of the third absorber 160, along with $H_2S$ enriched acid gas 175 entering at 162 at the base of the column recycled from the overhead 171 of the second regenerator 170. Lean amine from the second regenerator is divided into two streams: one stream 173 flows to the top of the third absorber at 163; and a second stream 174, which combines with lean amine from the first regenerator 140, and flows to the top of the first absorber at 122 and the second absorber at 137.

In the double effect system, greater concentrations of $H_2S$ are achieved by rejecting a stream of essentially pure $CO_2$ and water overhead from the third absorber at 164. This $CO_2$, which is rejected from the process, may be combined with $CO_2$ from the second absorber 130. The second effect should improve upon the first effect's $H_2S/CO_2$ ratio by approximately a factor of three. The overall Improvement in the ratio is therefore the product of the improvement in the first and second effects, which in the example cited is the product of 5 and 3. (if acid gas from the first effect has the $H_2S/CO_2$ ratio improved by a factor of 5, the overall ratio improvement leaving the second effect will be 15.) Thus, a $H_2S/CO_2$ ratio of only 1% should be improved to 15% in stream 172 by the use of a double effect system. A ratio of 15%, while still a relatively lean acid gas, is a practical concentration of $H_2S$ for feed to a Claus sulphur plant. Individual cases will obviously vary, with final concentrations depending an initial concentrations, and the degree of recycling employed in the process.

The arrangements described herein are based upon a theory of selective absorption of hydrogen sulphide over carbon dioxide from gas based on countercurrent contact between gas and tertiary or other amines which exhibit preferential affinity for $H_2S$ over $CO_2$ primarily because of differential rates of absorption of the two gases. The process of enhanced selective absorption is accomplished by performing the absorption in two steps. The first operation is to contact lean amine with sour gas which contains both $H_2S$ and $CO_2$. The object of the first operation is to produce an overhead gas that meets an arbitrary standard for content of $H_2S$ and $CO_2$. The second operation is to enhance the selectivity for $H_2S$ by contacting the rich amine leaving the first operation with a second gas which is a highly concentrated acid gas having a higher $H_2S/CO_2$ ratio than the first acid gas. The contact with the second gas occurs counter currently over a series of contact stages which causes the already rich amine to become even more heavily loaded with acid gas, but because of the high $H_2S/CO_2$ ratio of the second gas, the increased loading will be preferentially in favor of $H_2S$. The rich amine leaving the second operation will thus have a much higher proportion of $H_2S$ relative to $CO_2$ than rich amine from the first operation, and when regenerated will therefore produce a regenerator overhead gas that is likewise enriched in $H_2S$. The regeneration process strips essentially all of the acid gas from the rich amine, producing a regenerated lean solution having only minor amounts of residual $H_2S$ and $CO_2$. The regenerator overhead vapour contains the acid gases that have been stripped from the rich amine and will therefore have approximately the same $H_2S/CO_2$ ratio as existed in the rich amine. The source of the highly concentrated acid gas that contacts the rich amine in the second operation is the overhead vapour from the regenerator, a portion of which is recycled back to the lower stages of the second operation.

The process uses absorption to concentrate the amine solution preferentially with $H_2S$. Acid gases are bound to the amine by chemical reaction and this bond is not easily broken short of regeneration. The process preferentially loads the rich amine with $H_2S$ by pairing up as many as possible of fast reacting $H_2S$ molecules with amine molecules as quickly as possible, thus depriving the slow $CO_2$ molecules of active reaction sites and thus excluding them from the rich solution.

A version of the selective absorption process is provided in which the first and second operations take place in the same countercurrent absorption column which operates throughout at essentially the same pressure. In the first operation as described above, lean amine entering at the top of the upper section of the column comes in contact with sour gas containing both $H_2S$ and $CO_2$ which enters the column at an intermediate stage in the mid section of the absorber at the point where the first operation interfaces with the second operation. The first operation occurs in the upper section of the column and the second operation occurs in the lower section. Rich amine from the first operation flows downward into the stages of the second operation where it comes in contact with a highly concentrated acid gas having a higher $H_2S/CO_2$ ratio than the first gas which causes it to be much more heavily loaded with acid gas. But because of the high $H_2S/CO_2$ ratio of the second gas, the rich solution becomes preferentially loaded with $H_2S$, resulting in a much higher $H_2S/CO_2$ ratio in the rich amine from the second operation than in the rich amine from the first operation. The none-absorbed acid gas components from the second operation flow upward into the stages of the first operation where they blend with the incoming first sour gas, contacting the down flowing amine and giving up their acid gas components as the gas flows upward to the top stage of the column. Gas exiting the top of the column will meet the required specifications for $H_2S$ content. $CO_2$ in the overhead gas will be the none absorbed $CO_2$ that was not picked up by the rich amine exiting the bottom of the column. The combined actions of the first and second absorption operations will attain an internal balance in which the rich amine leaving the base of the column will be enriched in $H_2S$, while the $CO_2$ thus excluded from the rich amine solution will exit from the top of the column along with the sweetened product gas from which the $H_2S$ has been removed. A single lean amine feed at the top of the first operation will in most cases be adequate, but in some circumstances multiple lean amine feeds may be advantageous.

The source of the highly concentrated acid gas which constitutes the bottom feed for the second operation is normally a portion of the regenerator overhead vapour which is compressed and recycled back to the base of the absorber column.

A version of the selective absorption process is disclosed herein in which the first and second operations take place in two different absorber towers operating at different pressures. The first operation, which typically operates at a higher pressure than the second operation, sweetens incoming sour feed gas to meet product specifications for $H_2S$. $CO_2$ is also removed and by appropriate design methods it is possible, within limits, to control the amount of $CO_2$ removed. The second absorber tower provides an additional degree of freedom in controlling the amount of $CO_2$ in the sweet gas product from the first tower by taking greater advantage of the amine's natural preference for $H_2S$. The process of partially removing the $CO_2$ is referred to "slipping" in which a portion of the $CO_2$ is permitted to exit with the sweetened product gas. Lean amine enters the first absorber, picks up $H_2S$ and a portion of the $CO_2$ and exits from the base of the column as rich amine.

The rich amine then flows to the second absorber, which typically operates at a lower pressure than the first absorber, entering on an intermediate stage between the top and bottom of the column. A highly concentrated acid gas stream with an enhanced $H_2S/CO_2$ ratio enters at the bottom stage of the second absorber where it flows upward in contact with downflowing amine solution. A portion of the amine is the rich amine from the first operation, which, although already partially loaded with acid gas will become much more heavily loaded because of the concentrated acid gas entering at the base of the column. Because the acid gas has an elevated $H_2S/CO_2$ ratio, the rich amine leaving the base of the second absorber will be preferentially loaded with $H_2S$.

Rich amine from the first operation is capable of bulk absorption of acid gas, but because the amine is already partially loaded with acid gas, it is not capable of quantitatively absorbing the $H_2S$ from the gas. Vapours leaving the intermediate feed stage will be mostly $CO_2$ but will also contain significant amounts of $H_2S$, which must be removed. Since it is desirable to produce an overhead vapour from the second absorber that is essentially free of $H_2S$, it is necessary to contact the gas in the upper section of the second absorber with a lean stream of amine that enters on the top stage. The lean amine, having a very low residual $H_2S$ content is capable of removing essentially all of the $H_2S$ from the acid gas stream, producing an overhead $CO_2$ vapour that is almost entirely free of $H_2S$.

Light vapours such as methane and ethane, which may have been dissolved in the rich amine from the first operation, will come out of solution at the reduced pressure of the second operation and may contaminate the overhead stream of $CO_2$. If these light vapours are objectionable in the $CO_2$ it is possible to exclude most of them by interposing a flash drum in the rich amine feed stream upstream of the second column where the reduced pressure of the flash drum will allow light dissolved vapours to evolve and be removed from the rich amine. The flash vapours will also contain minor amounts of $H_2S$ and $CO_2$.

At the rich amine feed stage of the second column the partially loaded amine from the upper stages of the absorber combine with the rich amine from the first column and flow downward to the lower stages of the second tower. The overall operation of the first and of the second absorbers will reach an internal balance in which the rich amine leaving the base of the column will be enriched in $H_2S$, while the $CO_2$ thus excluded from the amine will exit from the top of the second absorber as a water saturated $CO_2$ stream essentially free of $H_2S$.

Multiple lean amine feed points may be necessary on both the first and second absorbers in order to optimize selectivity of the amine for $H_2S$ under varying operating conditions.

The source of the concentrated acid gas feed for the second absorber is a portion of the $H_2S$ enriched acid gas overhead from the amine regenerator, which is compressed and recycled back to the base of the second absorber.

A version of the selective absorption process is disclosed herein in which enhanced enrichment in $H_2S$ is made possible through multiple stages of enrichment. The single effect system described above is inherently limited in its ability to improve the $H_2S/CO_2$ ratio in the acid gas above that attainable in the conventional amine process to an approximate factor of five. The conventional system would have approximately the same $H_2S/CO_2$ ratio as the rich amine from the first operation. Attempts at improving the $H_2S/CO_2$ ratio beyond this level using the process of claim 3 will require a dramatic increase in the volume of acid gas recycled with a corresponding very large increase in energy consumption. So for cases, which have an extremely low $H_2S/CO_2$ ratio, a multiple effect acid gas enrichment system should be considered. For example, if a double effect system were used in which the $H_2S/CO_2$ ratio could be improved by a factor of 5 for each effect, the overall improvement would be the product of the factors for each effect, which in this case would be a 25 fold improvement in the $H_2S/CO_2$ ratio.

In a multiple effect system, the regenerator effluent acid gas from the first effect does not go to a sulphur plant. Instead it goes to a third absorber tower where it is contacted by a stream of rich amine split off from the rich amine feed to the second absorber. The rich amine enters on an intermediate stage of the added absorber and a lean stream of amine enters at the top stage. A stream of essentially pure $CO_2$ which is saturated with water is discharged overhead from the third column and the rich amine from the base of the column flows to a second regenerator which produces an overhead acid gas which is considerably richer in $H_2S$ than the acid gas from the preceding regenerator. A portion of the concentrated acid gas from the second regenerator is then compressed and) recycled back to the base of the third absorber where it is processed for removal of $H_2S$. The regenerated lean amine from the added regenerator is combined with other regenerated lean amine in the system and is circulated to the top stages of the absorber columns.

The double effect system retains all elements of the single effect system and adds an additional absorber tower and an additional regenerator along with all the necessary additional exchangers, pumps, and piping.

The double effect system could be extended to a triple effect system or a quadruple effect system by adding additional stages of absorption and regeneration.

A version of the process is disclosed herein wherein the differing needs for lean solution purity in terms of residual $H_2S$ and $CO_2$ for each individual absorber are addressed by using two different lean amine streams from a single regeneration still column. Lean amine following regeneration will contain residual amounts for both $H_2S$ and $CO_2$, which can detract from the performance of the absorbers. Each individual absorber has a different level of tolerance for residuals in the lean solution. With the process of the claims the residuals must be reduced to meet the most severe needs of either of the two absorbers. Reducing residual $H_2S$ and $CO_2$ to very low levels requires a high expenditure of energy in the reboiler.

Typically the first absorber tower with its higher operating pressure is more tolerant of residuals than is the lower pressure second tower, which requires very low residuals. By allowing the severest needs of one tower to dictate the purity of the lean amine for both towers, additional regeneration energy is expended unnecessarily. A normal lean amine would typically serve the needs of the first tower, while a super-lean solution would be required for the low pressure second absorber.

In the amine regeneration still column the level of residual $H_2S$ and $CO_2$ varies at different levels in the column. The lowest residuals are at the base of the column where the amine is subjected to the most intense steaming from the reboiler. Further up the still column, several stages above the reboiler, the amine's exposure to steam and temperature is lower, and the level of residuals in the solution is correspondingly higher. It is therefore possible to draw two lean streams of differing compositions from the regenerator. One stream with normal levels of residual $H_2S$ and $CO_2$ would be drawn from a stage above the reboiler. The second super lean stream would be drawn from the level of the reboiler. These two individual regenerated lean amine streams would be pumped separately to their own respective individual absorbers; the lean stream normally to the first absorber and the super lean stream normally to the second absorber. By dividing the lean amine into these separate streams will result in a reduction in reboiler duty of typically ten to fifteen percent will result.

A process can be provided that integrates existing pieces of conventional plant equipment into a new process that employs any of the principles described above. An existing conventional amine plant for example could be upgraded to be equal to or equivalent to any of the processes described in the claims above by installing additional equipment. It is anticipated that a major application of the new technology will be to modify existing gas plants as necessary to improve performance by meeting the requirements of the new process. Existing equipment will be used to the maximum extent possible to minimize the cost of the upgrade. The final plant configuration will include the reuse of existing equipment plus whatever additional equipment is necessary to meet the demands of the new process.

A version of the processes described above can be provided in which one of the principal purposes of the process described herein is to maximize recovery of $CO_2$ for commercial sale. In this case the first operation, which is conducted in the first absorber, rather than allowing a portion of the $CO_2$ to be deliberately "slipped" into the overhead gas, is designed to recover a major portion of the $CO_2$ in the rich amine leaving the first absorber. This differs from the arrangement described herein in which $CO_2$ is recovered but merely as a by-product, which may or may not have commercial value. In one arrangement described herein, the object is to maximize recovery of $CO_2$ from the inlet gas for the purpose of producing a marketable $CO_2$ product.

Having absorbed a major portion of the available $CO_2$ in the rich amine exiting the first absorber, the next step normally would be to flash off the light gases, principally methane and ethane that may have been absorbed in the first operation. If it is desired to eliminate a significant portion of these light ends from the rich amine a flash tank should be used, employing the optimum combination of preheat and reduced pressure to attain the desired separation. A small quantity of $CO_2$ will unfortunately be lost in the overhead from the flash tank. Light gases, if not flashed off, will appear as contaminants in the $CO_2$ product stream. The flash tank is an option, depending on the amount of light gas that can be tolerated in the $CO_2$ product.

The rich amine, whether degassed or not, then proceeds to the second absorber, or in the case of a double effect unit, to the second and third absorbers. The rich amine is then contacted with the recycled enriched acid gas and lean amine to produce an overhead product that is essentially pure water saturated $CO_2$. The rich amine leaving the base of the column is then regenerated to produce lean amine plus an enriched add gas overhead stream, a portion of which is recycled back to the base of the column. The balance of this acid gas flows to other processing units, typically a sulphur plant.

The $CO_2$ overhead product is typically 98% (MOL) carbon dioxide. The product will also be contaminated by light hydrocarbon gases and a fraction of a percent of hydrogen sulphide. There may also be traces of organic sulphur, amine or other contaminants that may have been present in the feed stream.

Commercially marketable carbon dioxide can currently be grouped into the four following grades. The standards to be met do not necessarily meet any universally recognized set of specifications, so the quality of this product is often determined on a case by case basis, as agreed between buyer and seller:

Injection grade $CO_2$ contains a minimum of 98% (MOL) $CO_2$ and is used for miscible flooding of oil reservoirs. Specifications for this product are loosely defined, and normally the only processing required is dehydration of the overhead $CO_2$ from the second (or third) absorber.

Frac grade $CO_2$ is 98.0% pure and is used for the fracturing reservoir rock in petroleum reservoirs, which together with a propping agent, is used to improve permeability adjacent to the wellbore. Specifications are essentially the same as for injection grade $CO_2$ except for a standard for $H_2S$ and organic sulphur content. Beverage grade $CO_2$ must be a minimum of 99.90% (MOL) pure $CO_2$ and has strict PPM limits for all impurities plus a standard for odor, color and taste when dissolved in water. Like all standards for potable products the standards for purity and processing methods are extremely high.

Food grade $CO_2$ must be a minimum of 99.8%(MOL) pure $CO_2$ and in most respects is similar to beverage grade $CO_2$ except that tolerance for impurities is in many cases lower.

The $CO_2$ product described above could be a feed stock for various standard downstream processes to produce commercial grades of $CO_2$.

The above description is intended in an illustrative rather than a restrictive sense, and variations to the specific configurations described may be apparent to skilled persons in adapting the present process described herein to other specific applications. Such variations are intended to form part of the present invention insofar as they are within the spirit and scope of the claims below. For instance, it will be appreciated that the present process may be extended to a third effect or more, increasing the concentration of $H_2S$ at each stage. For each succeeding effect, the feed Into the low pressure absorber would be the acid gas produced by the preceding effect.

It is obvious that the process scheme described in FIG. 6 in which the absorber receiving the recycled acid gas operates at a pressure lower than that of the regenerator could also apply to the double effect process. In a multiple effect system some or all of the low pressure absorbers may operate at a pressure lower than that of their respective regenerators.

The invention claimed is:

1. A method of selective absorption of hydrogen sulfide relative to carbon dioxide from a supply gas stream comprising:

providing a supply gas stream containing at least a product gas, hydrogen sulfide and carbon dioxide;

providing an absorbent which absorbs both hydrogen sulfide and carbon dioxide while exhibiting preferential affinity for hydrogen sulfide relative to carbon dioxide;

generating a stream of the absorbent which moves from a lean condition in countercurrent flow over a series of contact stages to a stream of the supply gas so as to contact the absorbent with the supply gas stream so as to absorb at least partly the hydrogen sulfide and the carbon dioxide to form a rich absorbent while generating a stream of sweetened product gas which contains levels of hydrogen sulfide and carbon dioxide below a predetermined maximum allowable value;

passing the rich absorbent through a regeneration process which strips substantially all of the hydrogen sulfide and carbon dioxide from the rich absorbent returning the absorbent to the lean condition for said stream while generating a stream of the hydrogen sulfide and carbon dioxide;

providing a first absorber and a second absorber;

in the first absorber supplying absorbent in lean condition and contacting the absorbent in lean condition with the supply gas stream so that a stream of the sweetened product gas is extracted from the first absorber and a stream of the absorbent in rich condition is extracted from the first absorber;

supplying to an intermediate stage of the second absorber the stream of the absorbent in rich condition from the first absorber;

supplying to the second absorber a stream of the absorbent in lean condition;

from the second absorber extracting the absorbent in rich condition and supplying the extracted absorbent in rich condition as a single stream containing the absorbent in rich condition from the first and second absorbers to the regeneration process;

in the second absorber the selectivity for hydrogen sulfide relative to carbon dioxide is enhanced by contacting the rich absorbent leaving the first absorber with a second gas which has a higher ratio of hydrogen sulfide relative to carbon dioxide than the supply gas stream so as to cause the already rich absorbent to become even more heavily loaded with hydrogen sulfide and carbon dioxide, but because of the high ratio of the second gas, the increased loading is preferentially in favor of hydrogen sulfide;

wherein the first absorber is arranged to control the amount of carbon dioxide in the sweetened product gas from the first tower by taking greater advantage of the natural preference of the absorbent for hydrogen sulfide to effect "slipping" of the carbon dioxide in the first absorber in which a portion of the carbon dioxide is permitted to exit with the sweetened product gas.

2. The method according to claim 1 wherein the source of the second gas is the stream of the hydrogen sulfide and carbon dioxide, a portion of which is recycled back to the second absorber, where the stream of the hydrogen sulfide and carbon dioxide contains approximately the same ratio as existed in the rich absorbent after the second absorber.

3. The method according to claim 1 wherein the contact with the second gas in the second absorber occurs counter currently over a series of contact stages.

4. The method according to claim 1 wherein the first and second absorbers are defined in the same countercurrent absorption column which operates throughout at substantially the same pressure.

5. The method according to claim 4 wherein absorbent in lean condition entering at a top of an upper section of the column comes in contact with sour gas containing both $H_2S$ and $CO_2$ which enters the column at an intermediate stage in the mid section of the absorber at a point where the first absorber interfaces with the second absorber, wherein the first absorber is located in the upper section of the column and the second absorber is located in a lower section such that the combined actions of the first and second absorbers will attain an internal balance in which the absorbent in rich condition leaving a base of the column is enriched in $H_2S$, while the $CO_2$ thus excluded from the absorbent in rich condition exits from the top of the column along with the sweetened product gas from which the $H_2S$ has been removed.

6. The method according to claim 5 wherein there is provided a single feed of the absorbent in lean condition at a top of the first absorber.

7. The method according to claim 5 wherein there are provided a plurality of feeds of the absorbent in lean condition at different positions through the first and second absorbers.

8. The method according to claim 1 wherein the first and second absorbers comprise a first absorber tower and the second absorber comprises a second absorber tower operating at a different pressure from the first absorber tower.

9. The method according to claim 1 including interposing a flash drum in the stream of absorbent in rich condition from the first absorber where a reduced pressure of the flash drum allows light dissolved vapors to evolve and be removed from the absorbent.

10. A method of selective absorption of hydrogen sulfide relative to carbon dioxide from a supply gas stream comprising:
providing a supply gas stream containing at least a product gas, hydrogen sulfide and carbon dioxide;
providing an absorbent which absorbs both hydrogen sulfide and carbon dioxide while exhibiting preferential affinity for hydrogen sulfide relative to carbon dioxide;
generating a stream of the absorbent which moves from a lean condition in countercurrent flow over a series of contact stages to a stream of the supply gas so as to contact the absorbent with the supply gas stream so as to absorb at least partly the hydrogen sulfide and the carbon dioxide to form a rich absorbent while generating a stream of sweetened product gas which contains levels of hydrogen sulfide and carbon dioxide below a predetermined maximum allowable value;
passing the rich absorbent through a regeneration process which strips substantially all of the hydrogen sulfide and carbon dioxide from the rich absorbent returning the absorbent to the lean condition for said stream while generating a stream of the hydrogen sulfide and carbon dioxide;
providing a first absorber and a second absorber;
in the first absorber supplying absorbent in lean condition and contacting the absorbent in lean condition with the supply gas stream so that a stream of the sweetened product gas is extracted from the first absorber and a stream of the absorbent in rich condition is extracted from the first absorber;
supplying to an intermediate stage of the second absorber the stream of the absorbent in rich condition from the first absorber;
supplying to the second absorber a stream of the absorbent in lean condition;
from the second absorber extracting the absorbent in rich condition and supplying the extracted absorbent in rich condition to the regeneration process;
in the second absorber the selectivity for hydrogen sulfide relative to carbon dioxide is enhanced by contacting the rich absorbent leaving the first absorber with a second gas which has a higher ratio of hydrogen sulfide relative to carbon dioxide than the supply gas stream so as to cause the already rich absorbent to become even more heavily loaded with hydrogen sulfide and carbon dioxide, but because of the high ratio of the second gas, the increased loading is preferentially in favor of hydrogen sulfide;
wherein the first and second absorber are arranged such that partially loaded absorbent from upper stages of the second absorber combines with the stream of the absorbent in rich condition from the first absorber and flows downward to lower stages of the second absorber;
and wherein the first and second absorbers are arranged such that overall operation of the first and of the second absorbers reaches an internal balance in which the absorbent in rich condition leaving the bottom of the second absorber is enriched in hydrogen sulfide, while the carbon dioxide thus excluded from the absorbent exits from the top of the second absorber as a water saturated carbon dioxide stream essentially free of hydrogen sulfide.

11. A method of selective absorption of hydrogen sulfide relative to carbon dioxide from a supply gas stream comprising:
providing a supply gas stream containing at least a product gas, hydrogen sulfide and carbon dioxide;
providing an absorbent which absorbs both hydrogen sulfide and carbon dioxide while exhibiting preferential affinity for hydrogen sulfide relative to carbon dioxide;
generating a stream of the absorbent which moves from a lean condition in countercurrent flow over a series of contact stages to a stream of the supply gas so as to contact the absorbent with the supply gas stream so as to absorb at least partly the hydrogen sulfide and the carbon dioxide to form a rich absorbent while generating a stream of sweetened product gas which contains levels of hydrogen sulfide and carbon dioxide below a predetermined maximum allowable value;
passing the rich absorbent through a regeneration process which strips substantially all of the hydrogen sulfide and carbon dioxide from the rich absorbent returning the absorbent to the lean condition for said stream while generating a stream of an acid gas product containing the hydrogen sulfide and carbon dioxide;
providing a first absorber and a second absorber;
in the first absorber supplying absorbent in lean condition and contacting the absorbent in lean condition with the supply gas stream so that a stream of the sweetened product gas is extracted from the first absorber and a stream of the absorbent in rich condition is extracted from the first absorber;
supplying to an intermediate stage of the second absorber a portion of the stream of the absorbent in rich condition from the first absorber;
supplying to the second absorber a stream of the absorbent in lean condition;
from the second absorber extracting the absorbent in rich condition and supplying the extracted absorbent in rich condition as a single stream containing the absorbent in rich condition from the first and second absorbers to the regeneration process;

in the second absorber the selectivity for hydrogen sulfide relative to carbon dioxide is enhanced by contacting the rich absorbent leaving the first absorber with a second gas which has a higher ratio of hydrogen sulfide relative to carbon dioxide than the supply gas stream so as to cause the already rich absorbent to become even more heavily loaded with hydrogen sulfide and carbon dioxide, but because of the high ratio of the second gas, the increased loading is preferentially in favor of hydrogen sulfide;

providing a third absorber and a second regeneration process;

wherein the acid gas product from said regeneration process and a portion of the absorbent in rich condition from the first absorber are sent to the third absorber;

wherein absorbent in rich condition from the third absorber is sent to the second regeneration process which produces an acid gas product in which the hydrogen sulfide is more concentrated than the acid gas product from the first regeneration process;

and wherein a portion of the acid gas product from the second regeneration process is recycled to the third absorber where it is contacted with a side stream of the absorbent in rich condition from the first absorber, which enters at a mid section of the third absorber, and by absorbent in lean condition that enters at a top of the third absorber, producing an overhead stream of carbon dioxide and water vapor from the third absorber.

12. The method according to claim 1 wherein the absorbent in lean condition for the first absorber is drawn from a stage in the regeneration process above a reboiler while the absorbent in lean condition for the second absorber is drawn from the bottom of the regeneration process in order to meet the differing tolerances of the first and second absorbers for residual acid gas in the absorbent in lean condition.

13. A method of selective absorption of hydrogen sulfide relative to carbon dioxide from a supply gas stream comprising:

providing a supply gas stream containing at least a product gas, hydrogen sulfide and carbon dioxide;

providing an absorbent which absorbs both hydrogen sulfide and carbon dioxide while exhibiting preferential affinity for hydrogen sulfide relative to carbon dioxide;

generating a stream of the absorbent which moves from a lean condition in countercurrent flow over a series of contact stages to a stream of the supply gas so as to contact the absorbent with the supply gas so as to absorb at least partly the hydrogen sulfide and the carbon dioxide to form a rich absorbent while generating a stream of sweetened product gas which contains levels of hydrogen sulfide and carbon dioxide below a predetermined maximum allowable value;

passing the rich absorbent through a regeneration process which strips substantially all of the hydrogen sulfide and carbon dioxide from the rich absorbent returning the absorbent to the lean condition for said stream while generating a stream of the hydrogen sulfide and carbon dioxide;

providing a first absorber and a second absorber;

in the first absorber supplying absorbent in lean condition and contacting the absorbent in lean condition with the supply gas stream so that a stream of the sweetened product gas is extracted from the first absorber and a stream of the absorbent in rich condition is extracted from the first absorber;

supplying to an intermediate stage of the second absorber the stream of the absorbent in rich condition from the first absorber;

supplying to the second absorber a stream of the absorbent in lean condition;

from the second absorber extracting the absorbent in rich condition and supplying the extracted absorbent in rich condition to the regeneration process;

in the second absorber the selectivity for hydrogen sulfide relative to carbon dioxide is enhanced by contacting the rich absorbent leaving the first absorber with a second gas which has a higher ratio of hydrogen sulfide relative to carbon dioxide than the supply gas stream so as to cause the already rich absorbent to become even more heavily loaded with hydrogen sulfide and carbon dioxide, but because of the high ratio of the second gas, the increased loading is preferentially in favor of hydrogen sulfide;

wherein, in order to maximize recovery of $CO_2$ as a by-product, slipping of $CO_2$ in the first absorber is minimized by adjusting operating conditions including solution concentration, circulation rate, type of contacting device and/or stages of contact so as to increase $CO_2$ absorption in the first absorber thus enabling increased $CO_2$ production in the second absorber.

14. The method according to claim 1 in which side coolers are used on the absorbers to cool the process and to reduce the rate of the $CO_2$ reaction with the absorbent.

* * * * *